G. C. PECK & H. B. SHIELDS.
BREAD TOASTER.
APPLICATION FILED APR. 13, 1917.
1,266,308.
Patented May 14, 1918.
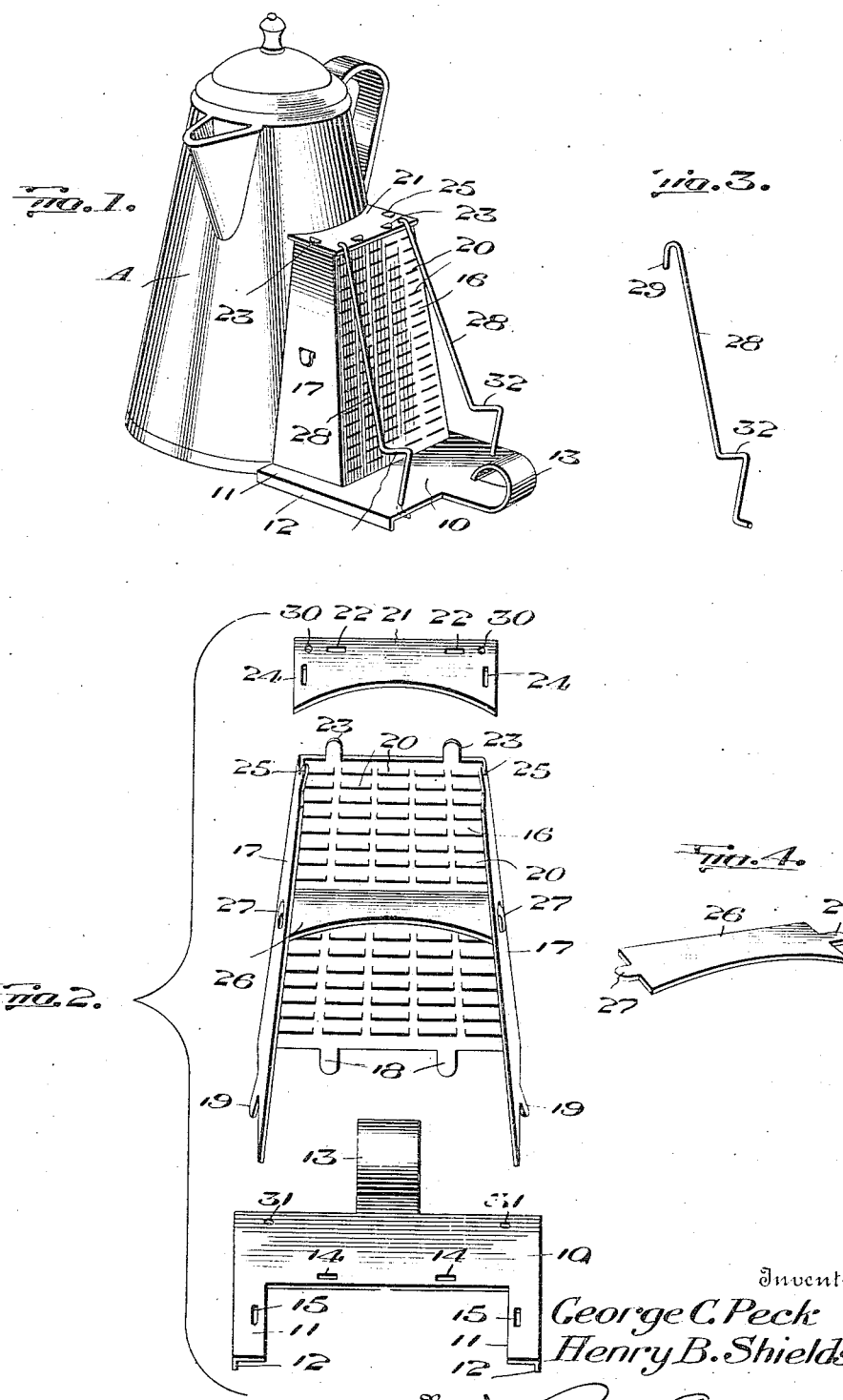
Inventors
George C. Peck
Henry B. Shields

UNITED STATES PATENT OFFICE.

GEORGE C. PECK AND HENRY B. SHIELDS, OF SCHENECTADY, NEW YORK.

BREAD-TOASTER.

1,266,308.　　　　Specification of Letters Patent.　　Patented May 14, 1918.

Application filed April 13, 1917. Serial No. 161,810.

*To all whom it may concern:*

Be it known that we, GEORGE C. PECK and HENRY B. SHIELDS, citizens of the United States, and residents of Schenectady, in the county of Schenectady and State of New York, have invented a certain new and useful Improvement in Bread-Toasters, of which the following is a specification.

The present invention relates to cooking utensils, and particularly to a device for toasting bread.

An object of the present invention is to provide a toaster of this character which may be placed over a gas stove burner, or the like, with another cooking utensil, such as a coffeepot, to utilize the heat of the one burner for making coffee and also for toasting bread; thus not only effecting a saving in fuel consumption, but also economizing in space.

The invention further aims at the provision of a toaster embodying these features, and which is of such form that it may be economically and easily manufactured from sheet metal.

The above, and various other objects and advantages of this invention will be in part described, and in part understood, from the following detailed description of the present preferred embodiment, the same being illustrated in the accompanying drawing wherein:

Figure 1 is a perspective view of a toaster constructed according to the present invention, showing the toaster nested against one side of a second cooking utensil.

Fig. 2 is an isometric perspective view of the main parts of the toaster, the parts being disassociated.

Fig. 3 is a detail side elevation of the article support for the toaster.

Fig. 4 is a detail perspective view of the baffle plate employed.

Referring to the drawing, 10 designates a base plate provided at its inner edge with a preferably angularly shaped recess which is relatively large, and which forms projections 11 at the opposite ends of the base plate adapted for engagement against the sides of a second cooking utensil to space the body portion of the plate 10 the desired distance therefrom. The lateral edges of the base plate 10 are turned down to form supporting flanges 12 for engagement with the top of the stove or the like, and which are adapted to reinforce the base plate. The outer end of the base plate 10 is provided, preferably intermediate the lateral edges thereof, with an outwardly extending and upwardly rolled over tongue 13 forming a hand-hold by means of which the toaster may be moved into and out of position. The inner marginal edge of the base plate 10 is provided with a pair of spaced-apart slots 14, and the arms 11 of the base plate are provided at their inner marginal edges each with a slot 15.

The body portion of the toaster is stamped from a single sheet of metal and is bent to provide a front wall 16 and side walls 17. The side walls 17 are in the form of flanges which are bent backwardly from the lateral edges of the front wall 16, and the lines of bending are inclined so that the front wall 16 inclines upwardly and rearwardly from the base 10. The lower edge of the front wall 16 is provided with depending lips or projections 18 adapted to fit in the slot 14 of the base plate, and to be turned over against the lower face of the latter to hold the body to the base plate. The lateral walls 17 have upon their lower ends lips or projections 19 which are adapted to pass through the slots 15 of the base plate and to be turned over against the lower face of the latter to hold the body to the base plate. The lateral walls 17 have upon their lower ends lips or projections 19 which are adapted to pass through the slots 15 of the base plate and to be turned over thereagainst to secure the side walls 17 in their proper angular relation upon the base plate 10. The body plate of the toaster is so punched and pressed as to provide the front wall 16 thereof with a plurality of transversely extending slits 20, the upper marginal portions of which are pressed inwardly to direct the rising heated air outwardly through the front plate or wall 16.

A top plate 21 is employed, the same preferably comprising a relatively flat sheet metal blank adapted to rest upon the upper edges of the front wall 16 and the side walls 17. The top plate 21 has, adjacent to its forward marginal edge, a pair of spaced-apart slots 22 adapted to receive therethrough upstanding lugs or projections 23 formed on the upper marginal edge of the front wall 16. The top plate 21 is also provided, adjacent to its lateral edges, with slots 24 adapted to receive therethrough the upstanding lugs 25 formed upon the upper marginal edges of the side walls 17. The lugs 23 and 25 are adapted to be overturned against the upper face of the top plate 21, as shown in Fig. 1, to retain the top plate in position, and to rigidly support the body.

If desired, a baffle plate 26 may be employed within the body of the toaster. The baffle plate 26 comprises, as shown to advantage in Fig. 4, a relatively flat sheet metal blank adapted to fit against the inner faces of the front wall 16 and the side walls 17. The lateral edges of the baffle plate 26 are provided with outwardly extending lips 27 adapted to pass through slots 28 formed in the side walls 17, and to be turned over against the outer faces of the latter. The baffle plate 26 thus reinforces the sides 17 of the body, and serves to deflect the rising heated air forwardly through the slits or openings 20 in the front wall 16.

It will be noted from Fig. 2, particularly, that the rear edges of the top plate 21 and the baffle plate 26 are concaved to substantially conform to the curvature of the outer wall of a cooking utensil, such as a coffee pot A, as shown in Fig. 1. The adjacent wall of the coffee pot A is adapted to seal the rear side of the body of the toaster so that the heat which rises within the body of the toaster through the relatively large opening in the base plate 10, is confined within the body of the toaster and has an outlet therethrough only through the slits 20 in the front wall thereof.

The toaster is provided with a bread support in the form of a pair of wires 28 provided upon their upper ends with overturned hooks 29 adapted to extend downwardly through openings 30 formed in the top plate 21 adjacent to the lateral edges thereof. The lower ends of the wires 28 pass downwardly through apertures 31 formed in the base plate 10 at its forward edge and adjacent to its opposite lateral edges. The wires 28 are thus held in spaced-apart position, and are also spaced forwardly from the front wall 16 of the body. The body preferably tapers upwardly, and the wires 28 thus converge to some extent from the base 10 to the top plate 21. The wires 28 are provided, adjacent to their lower ends, each with a shoulder 32 formed by offsets in the lower ends of the wires 28 forwardly, the shoulders 32 serving as a support for a slice of bread or the like. The wires 28 are inclined upwardly and rearwardly to support the slice of bread or the like in an inclined position and in spaced relation from the front wall 16 of the toaster. In this manner, the bread is not readily burned, and the heat is evenly distributed over the surface of the bread to uniformly and thoroughly heat the same. The lower ends of the wires 28 may be turned forwardly or laterally for engagement against the lower face of the base 10 to hold the wires 28 firmly in position.

It will thus be observed that the toaster is made from but four punch pressed parts, and a length of wire which may be readily cut and bent into the desired form. The device may thus be economically manufactured and sold at a relatively small cost.

In use, the handle 13 of the toaster is grasped, and the open or rear side of the toaster is placed against a coffee or tea pot, such as shown in Fig. 1. The adjacent side of the pot serves as a closure wall for the body of the toaster and preferably the utensil A is moved slightly to one side over the burner to place the base 10 partly over the burner. The heat rising from the burner is thus divided between the utensil A and the toaster.

The device is particularly useful in small households, rooming houses, and in other places where space is limited and may also be easily employed for preparing lunches and the like on pleasure trips.

It is of course understood that various changes and modifications may be made in the details of construction of the above specifically described toaster without departing from the spirit of the invention, and being restricted only by the scope of the following claims.

We claim:—

1. A toaster adapted to fit against one side of a cooking utensil and over a single burner therewith, comprising a base, a hollow slitted body rising from the base open at its inner side and adapted to fit thereat against said utensil to collect heated air rising thereabout, and a toast rack arranged exteriorly of the body.

2. A toaster adapted to rest on a stove against a cooking utensil and over one side of a burner comprising a base provided with a hollow body with one side thereof substantially conforming to the wall of the cooking utensil and adapted to be fitted thereat against the utensil and over the single burner therewith.

3. In a bread toaster adapted to be placed over a burner against one side of a cooking utensil, the combination of a base plate, an open sided body rising from the base plate, a top plate closing the top of the body, and a bread support rising from the base in closely spaced relation from the body, said base plate and said top plate being recessed at their inner sides and adapted to fit against a cooking utensil for closing said open side of the body.

4. In a bread toaster adapted to be placed over a burner against one side of a cooking utensil, the combination of a base plate provided with a recess in its inner end, a body secured at its lower end to said base plate at the marginal edge of said recess therein, a top plate secured over the upper end of the body to close the same and provided with a recess in its rear edge, the toaster being adapted to be placed against a cooking utensil with the rear edges of the base and top plates receiving the adjacent wall of the utensil to close the open side of the body, and a bread support arranged in closely spaced relation from the opposite side of the body.

5. In a bread toaster, the combination of a base plate provided at its lateral edges with rearwardly extending arms, and having a forwardly rolled over tongue to provide a handle, a substantially U-shaped body portion secured at its lower edge to the marginal edge of said base plate and said arm, a top plate secured upon the upper edge of said body member to close the same and provided with a concaved rear edge, bread-supporting wires inclining upwardly from the base to the top plate, and a baffle plate arranged in said body intermediate the top and bottom thereof and having a concaved rear edge.

6. In a bread toaster adapted to be placed over a burner against one side of a cooking utensil, the combination of a substantially U-shaped body part having slits in the intermediate portion thereof, a base plate secured to the lower edge of said body part and being cut away to conform to the shape of the same, and a top plate carried by the body plate for closing the upper end of the same and having a concaved rear edge, said body part being adapted to be placed against a utensil over a single burner therewith with the open side of the body part against the utensil to close the body, and the rear edges of said base plate and said top plate being adapted to receive the said side of the utensil.

7. In a bread toaster, the combination of a base plate provided with downturned lateral edges forming reinforcing and supporting flanges, said base plate having its rear edge recessed, and provided at its forward edge with an outwardly extending upwardly rolled over tongue, a body plate bent substantially U-shaped and secured at one edge to the rear marginal edge portion of said base plate to provide a body open at its rear side, a top plate secured over the upper edge of said body plate to close the top of the body and provided with a rear concaved marginal edge, a wire bread support secured at its opposite ends to the base plate and to the top plate and arranged forwardly of the outer side of the body, the outer wall of said body plate being provided with openings therethrough directing heated gases from within the body to the bread on said wire support, and a baffle plate arranged within the body adapted to deflect the heated air rising through the body outwardly through said openings therein.

GEORGE C. PECK.
HENRY B. SHIELDS.